United States Patent [19]

Hashimoto

[11] Patent Number: 4,724,369
[45] Date of Patent: Feb. 9, 1988

[54] SPEED CONTROL APPARATUS IN MAGNETIC DISK APPARATUS
[75] Inventor: Yasuichi Hashimoto, Tokyo, Japan
[73] Assignee: Kabushiki Kaisha Toshiba, Kawasaki, Japan
[21] Appl. No.: 901,883
[22] Filed: Aug. 29, 1986
[30] Foreign Application Priority Data
  Aug. 30, 1985 [JP] Japan .................................. 60-191561
[51] Int. Cl.$^4$ ............................................. G05B 13/00
[52] U.S. Cl. ..................................... 318/561; 360/77; 360/78
[58] Field of Search ..................... 318/561; 360/77, 78
[56] References Cited
  U.S. PATENT DOCUMENTS
  4,516,178  5/1985  Lee ......................................... 360/78

Primary Examiner—William M. Shoop, Jr.
Assistant Examiner—Saul M. Bergmann
Attorney, Agent, or Firm—Finnegan, Henderson, Farabow, Garrett & Dunner

[57] ABSTRACT

A speed control apparatus includes a speed signal-holding circuit. Even if a discrete portion occurs in the position signal, i.e., if an abnormal signal component is included in the speed signal derived from position signal differentiation, the speed signal held by the holding circuit is output to prevent erroneous operation caused by the abnormal signal. In a magnetic disk apparatus incorporating the speed control apparatus, the magnetic head is driven before a seek instruction is completely input, and the position signal phases are switched at proper timings, thereby reliably performing both speed and positioning control operations of the magnetic head, at high speed.

12 Claims, 8 Drawing Figures

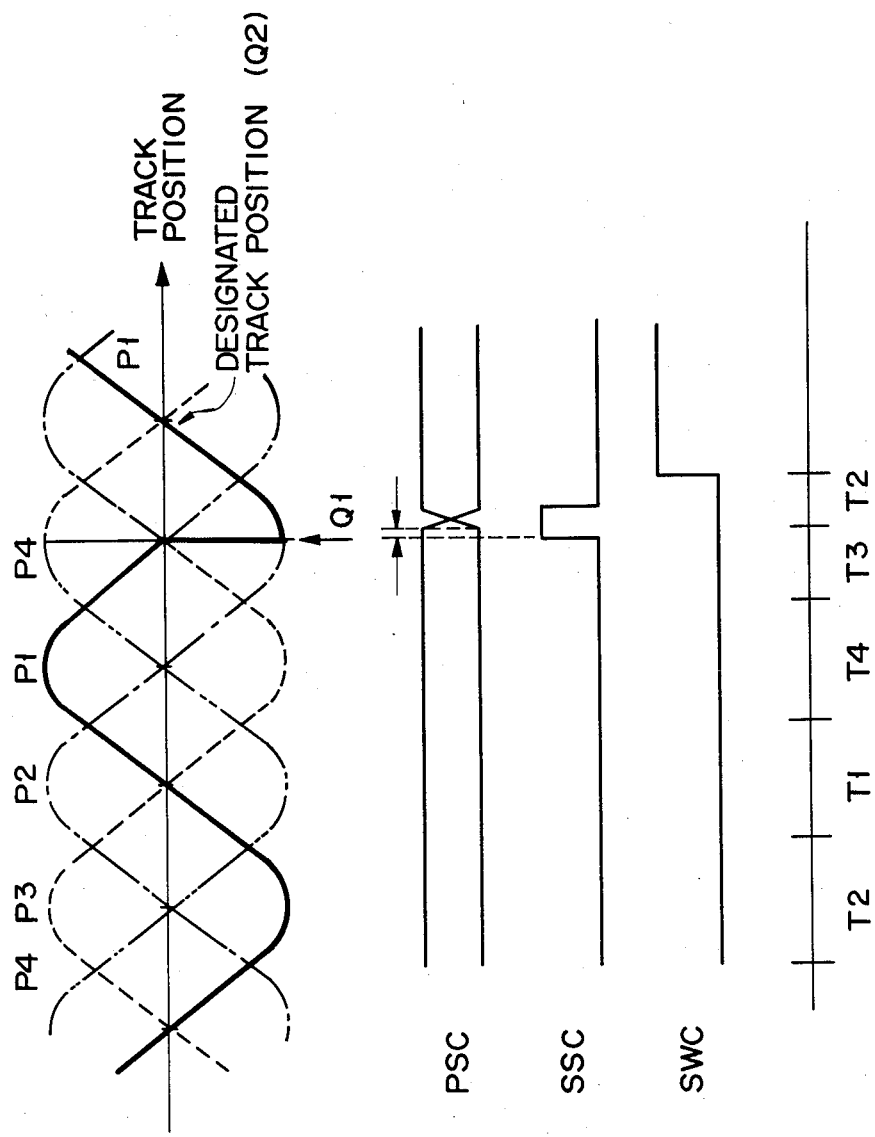

SPEED CONTROL APPARATUS IN MAGNETIC DISK APPARATUS

BACKGROUND OF THE INVENTION

The present invention relates to a speed control apparatus in a magnetic disk drive apparatus for generating a speed signal from sinusoid-like position signals, thereby controlling the position of a magnetic head in the magnetic disk apparatus.

In a conventional magnetic disk system, a magnetic head is moved to a track position designated by a seek instruction, based on servo data pre-recorded on a magnetic disk. In accordance with this positioning scheme, when the magnetic head is to be moved to the designated track position, servo data pre-recorded on the servo surface of the magnetic disk is read by the magnetic head to generate the position signal and designated speed data. A generated speed signal is differentiated to detect a designated moving speed signal of the magnetic head. The detected speed signal is compared with the designated speed data. In this manner, the magnetic head can be driven at a proper speed.

For example, the technique for generating the position signal based on the servo data pre-recorded on the magnetic disk is disclosed in U.S. Pat. No. 4,238,809, and the technique for generating the speed signal by differentiating the position signal is disclosed in U.S. Pat. No. 3,839,665.

The servo data-based position signal corresponding to each data track on the magnetic disk surface is an alternating signal of an interval of several tracks, for example, a sinusoid-like signal as a function of the track position. If the phase of the sinusoid-like position signal has to be changed during driving of the magnetic head, the differentiation operation for deriving the speed signal causes generation of a surge component in the speed signal. The surge component is independent of the actual speed, and if the speed signal including the surge component is used without being corrected, the magnetic head can not operate properly during speed control.

SUMMARY OF THE INVENTION

The present invention has been developed in consideration of the above situation, and has as its object to provide a speed-control apparatus for approximating an actual speed even if a surge signal component, independent of the actual speed, is generated during speed detection.

The speed control apparatus comprises:

Additional objects and advantages of the invention will be set forth in part in the description which follows, and in part will be obvious from the description, or may be learned by practice of the invention. The objects and advantages may be realized and attained by means of the instrumentalities and combinations particularly pointed out in the appended claims.

To achieve the objects, and in accordance with the purpose of the invention, as embodied and broadly described herein, speed signal-generating means for receiving a position signal, and for sequentially differentiating predetermined portions of the position signal to generate a speed signal; and surge-suppressing means for outputting the speed signal from the speed signal-generating means, the surge-suppressing means being adapted to suppress a surge component and to output the speed signal when the speed signal includes the surge component.

It is another object of the present invention to provide, in a magnetic head drive system, a simple magnetic head position-control apparatus for moving a magnetic head, at high speed, to a track position designated by a seek instruction. The magnetic disk apparatus comprises:

position data-reading means for causing a magnetic head to read servo data, and holding and outputting read data corresponding to the servo data;

detection signal-output means for receiving designated speed data, for generating a position signal according to the data held in the position data-reading means in response to a first instruction, for generating a speed signal with respect to a magnetic head according to the position signal in accordance with an absence of a second instruction and a surge component-suppressed speed signal in accordance with a presence of the second instruction, for comparing the input speed signal with the designated speed data to determine a speed difference signal, and for outputting one of the speed difference signal and position signal in response to a third instruction;

control means for generating the designated speed data to shift the magnetic head in response to an input seek instruction, for detecting a distance between the track position designated by the seek instruction and the current track position of the magnetic head according to the position signal from the detection signal-output means, for outputting the second instruction in response to a coincidence between a detected distance and a first predetermined distance, the first instruction being generated after outputting the second instruction such that the position signal is switched to have a predetermined waveform, for generating the designated speed data for stopping the magnetic head, and for outputting the third instruction in response to a coincidence between a detected distance and a second predetermined distance; and driving means for driving the magnetic head, based on the output from the detection signal-output means.

In accordance with the present invention as described in detail, even if a discrete portion occurs in the position signal, the abnormal signal component in the speed signal, obtained by the differential of the position signal, can be suppressed, in order to detect the normal speed signal. Therefore, even if the phase of the position signal is shifted during movement of the magnetic head, both speed and position control operations of the magnetic head can be accurately performed.

BRIEF DESCRIPTION OF THE DRAWINGS

FIG. 4A shows the waveform of a position signal when the magnetic head is stopped at the track position designated by the seek instruction;

FIGS. 4B to 4D show timings of signals PSC, SSC, and SWC output from a μCPU respectively; and FIG. 4E shows durations of the above signals.

DETAILED DESCRIPTION OF THE PREFERRED EMBODIMENT

Figure 1:
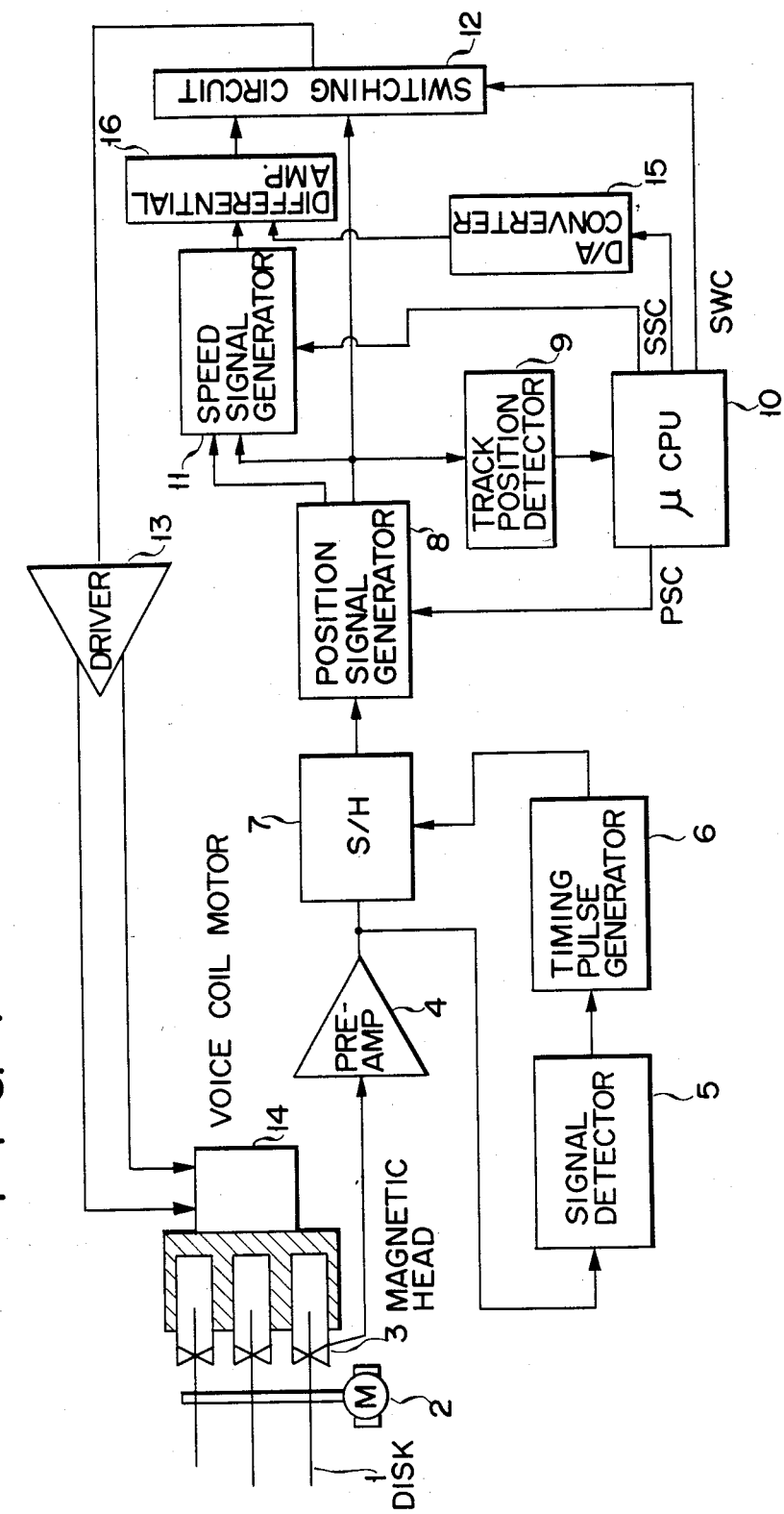
FIG. 1 is a block diagram showing configuration of a speed control apparatus in a magnetic disk apparatus, including a speed signal generator and a position signal generator, according to the embodiment of an present invention.

A speed control apparatus in a magnetic disk apparatus according to the present invention will now be described with reference to FIG. 1.

The arrangement of the speed control apparatus will first be described. Referring to FIG. 1, disk 1 is driven by spindle motor 2. Servo data on disk 1 is read by magnetic head 3. The read servo data is supplied to preamplifier 4. A signal amplified by preamplifier 4 is supplied to sample/hold circuit (S/H) 7 and signal detector 5. Signal detector 5 detects whether the input signal is significant, i.e., if the input signal exceeds a predetermined threshold level. A detection result is output to timing pulse generator 6.

In response to the output from signal detector 5, generator 6 generates a hold timing pulse signal to determine timings of S/H 7 for sampling and holding the signal amplified from preamplifier 4.

The held signal from S/H 7 is output to position signal generator 8, and generator 8 synthesizes the the held signal with a predetermined combination and generates two types of sinusoid-like position signals, i.e., P1 and P2, as shown in FIG. 4A. Generator 8 determines assignment of the position signals in response to signal PSC from microprocessor (μCPU) 10, and supplies one of the position signals, for example P1, to speed signal generator 11, track position detector 9, and switching circuit 12. Generator 8 also supplies another position signal, for example P2, to speed signal generator 11.

Figure 2:
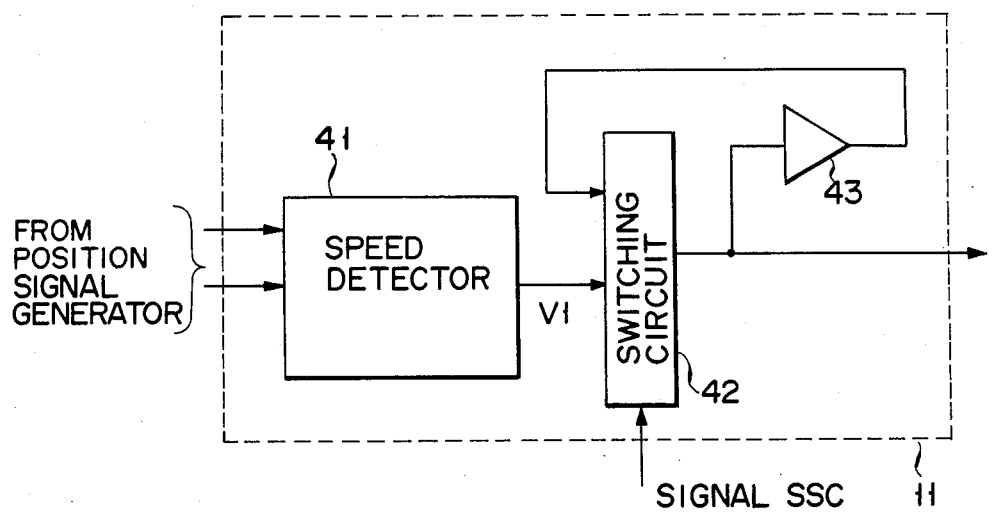
FIG. 2 is a block diagram showing of the speed signal generator shown in FIG. 1.

Speed signal generator 11 is shown in FIG. 2. This circuit detects a speed signal by differentiating the input position signals, and supplies the detected speed signal to differential amplifier 16. Speed signal generator 11 and differential amplifier 16 act as a speed difference circuit. In speed detector 41, of generator 11, two sinusoid-like; wave position signals are generated, P3 and P4, as shown in FIG. 4A, based on the position signals P1 and P2. Sinusoid-like wave position signal P1, and sinusoid-like wave position signal P2, whose phase leads signal P1 by 90°, are processed by inverters (not shown) in speed detector 41, so that position signals P1 to P4 are prepared. A substantially constant differential speed signal V1 is obtained by sequentially differentiating position signals P1 to P4. The differential speed signal V1 is supplied to switching circuit 42.

An output from switching circuit 42 is output to the external as a detected speed signal. At the same time, this output is input to holding circuit 43. An output from holding circuit 43 is fed back to the input of switching circuit 42. Signal SSC is input to switching circuit 42. Output from speed detector 41 or output from holding circuit 43 is selected in accordance with signal SSC, and the selected signal is output from switching circuit 42. Switching circuit 42 normally selects the output from speed detector 41. However, if signal SSC is input, switching circuit 42 selects the output signal from holding circuit 43. Switching circuit 42 and holding circuit 43 act as a surge-suppressing circuit.

If the phases of the input position signals are shifted, data held in holding circuit 43 is output prior to phase shifting, so as to greatly reduce the influence of the surge signal component occurring upon differentiation of the position signal. Track position detector 9 detects a pass-over signal on the basis of the selected position signal from position signal generator 8, and supplies the detected pass-over signal to μCPU 10. μCPU 10 generates signals PSC, SSC, and SWC in accordance with the output signal from track position detector 9. μCPU 10 also outputs to D/A converter 15 a designated digital speed signal corresponding to a displacement of magnetic head 3 from the destination track position. Converter 15 converts the designated digital speed data into a designated analog speed signal and supplies it to differential amplifier 16. Amplifier 16 compares the designated speed signal with the detected speed signal from generator 11 to determine a speed difference signal, and supplies the speed difference signal to switching circuit 12. Switching circuit 12 selectively outputs as a drive signal one of the output signals from generator 8 and amplifier 16 in response to signal SWC from μCPU 10.

The drive signal output from switching circuit 12 is input to driver 13. Driver 13 drives voice coil motor 14 to move magnetic head 3 across the tracks in accordance with the output signal from switching circuit 12.

The operation of the speed apparatus will now be described.

When the seek instruction is input from a magnetic disk controller (not shown) to magnetic disk apparatus, the number of pulses corresponding to the number of tracks for magnetic head 3 to be moved is supplied as the seek instruction due to an interface between the magnetic disk apparatus and the magnetic disk controller. μCPU 10 supplies the designated digital speed signal to D/A converter 15 before the pulse sequence from the magnetic disk apparatus as the seek instruction is completely input. Converter 15 converts the designated digital speed signal into the analog designated speed signal, and supplies it to differential amplifier 16. The speed difference signal is supplied as the drive signal to driver 13 through switching circuit 12. Voice coil motor 14 is driven to move magnetic head 3 by driver 13.

Servo data is pre-recorded on magnetic disk 1 and comprises different types of servo data for different track positions, so as to represent accurate track positions. When magnetic head 3 moves, e.g., to the destination track position by the seek instruction across the tracks, the position signal generated by position signal generator 8, on the basis of data read in by magnetic head 3, is amplified by preamplifier 4 and held by S/H 7. Each of these signals has a 4-track period and a 90° phase difference from each other. These sinusoid-like wave position signals are selected in response to signal PSC from μCPU 10. One of the position signal, for example P1, is supplied to track position detector 9.

The detected speed signal is generated, as has been described above with reference to FIG. 2, and magnetic head 3 is moved to the track position designated by the seek instruction. In this case, position signal generator 8 supplies, for example, signal P1 shown in FIG. 4A to track position detector 9 and switching circuit 12. Track position detector 9 detects and supplies to μCPU 10 the track pass-over signal upon the zero-crossing of position signal P1.

Figure 3:
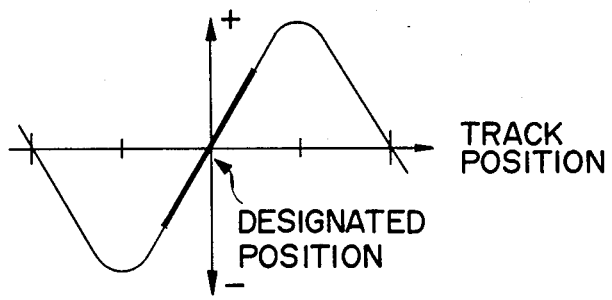
FIG. 3 shows a predetermined waveform of a position signal at a track position designated by a seek instruction.

If μCPU 10 determines, by counting the output from track position detector 9, that magnetic head 3 has reached a position within 2 tracks of the track position designated by the seek instruction, μCPU 10 outputs signals PSC and SSC as shown in FIGS. 4B and 4C, thereby switching the position signals. In this embodiment, the waveform in FIG. 3 is required at the track position designated by the seek instruction. When magnetic head 3 passes beyond the designated track position, the signal must be positive. However, when magnetic head 3 is located before the designated track position, the signal must be negative.

Magnetic head 3 is driven using the properly designated speed data and properly selected position signal before the seek instruction input is completed. For this reason, the position signal does not necessarily have the above-mentioned waveform at the designated track position, and position signal switching is required.

Assume that µCPU 10 detects, in response to the output from track position detector 9, that magnetic head 3 has reached a position within one track before designated track position Q2 in FIG. 4A, i.e., track position Q1. Also assume that the position signal output to switching circuit 12 is signal P1. Signal P1 does not have the predetermined waveform, shown in FIG. 3, at track position Q1. µCPU 10 outputs signal PSC (FIG. 4B) to position signal generator 8, so as to cause the position signals input to switching circuit 12 to have the predetermined waveform, i.e., as shown in FIG. 4A, to change signal $P_1$ to signal $P_4$, signal $P_2$ to signal $P_1$, signal P3 to signal $P_2$, and signal $P_4$ to signal $P_3$. In this case, if µCPU 10 does not output signal SSC, a discrete portion occurs in the detected speed signal. When speed detector 41 in FIG. 2 is operated, a surge signal component is inevitably generated. The surge signal component is independent of the moving speed of magnetic head 3, thereby causing a speed-determination operation error of magnetic head 3.

As shown in FIGS. 4B and 4C, µCPU 10 outputs signal SSC to speed signal generator 11 before it outputs signal PSC. Speed signal generator 11 causes holding circuit 43 to hold the detected speed signal and switching circuit 42 to output the signal from circuit 43, in response to signal SSC. Thereafter, the position signals are switched in response to signal PSC, so that the detected speed signal output from speed signal generator 11 to differential amplifier 16 is a signal whose surge signal component is suppressed.

When magnetic head 3 is moved further from track position Q1 to the half track position, µCPU 10 outputs signal SWC (FIG. 4D) to switching circuit 12. Switching circuit 12 supplies signal P1 from position signal generator 8 to driver 13. Driver 13 stops magnetic head 3 on the basis of signal P1.

It will be apparent to those skilled in the art that various modifications and variations can be made in the speed control apparatus of the present invention without departing from the scope or spirit of the invention. Thus, it is intended that the present invention cover the modifications and variations of this invention provided they come within the scope of the appended claims and their equivalents.

What is claimed is:

1. A speed control apparatus comprising:
    speed signal-generating means, receiving as inputs a plurality of input position signals, for producing a plurality of additional position signals from said input position signals, and for sequentially differentiating predetermined portions of the produced additional position signals and the input position signals to generate a speed signal; and
    surge-suppressing means, receiving as an input the generated speed signal, for suppressing a surge component in said speed signal and for selectively outputting one of the generated speed signal from said speed signal-generating means or the speed signal without the surge component at times when a control signal is input in sequence with said generated speed signal.

2. The apparatus according to claim 1, wherein said surge-suppressing means comprises:
    holding means, in accordance with the control signal, for holding the generated speed signal input from said speed signal-generating means, and for outputting the speed signal without the surge component; and
    switching means for selectively outputting one of the generated speed signal from said speed signal-generated means or the speed signal without the surge component from said holding means, in accordance with the control signal.

3. A magnetic disk apparatus comprising:
    position data-reading means for reading servo data representing track positions for a head, for holding the read servo data, and for outputting the held data as representing position data;
    position signal-generating means for generating position signals from the position data in accordance with a first instruction input thereto;
    speed difference detecting-means for receiving the position signals from said position signal-generating means, for producing a detected speed signal based on the received position signals in accordance with a second instruction input thereto, and for generating a speed difference signal representing a difference between the detected speed signal and a designated speed signal input thereto;
    switching means for receiving the speed difference signal from said speed difference detecting means and a selected position signal of the position signals from said position signal-generating means, and for selectively outputting as a drive signal one of the speed difference signal or the selected position signal in accordance with a third instruction input thereto;
    control means for outputting the designated speed signal to said speed difference detecting-means when a seek instruction is input, for detecting a distance from a current track position of said head to a destination track position designated by the seek instruction, based on the selected position signal from said position signal generating means, for outputting the first instruction to said position signal-generating means, the second instruction to said speed difference detecting-means and the third instruction to said switching means in accordance with the detected distance; and
    driving means for driving said head to the destination track position based on the drive signal from said switching means.

4. The apparatus according to claim 3, wherein said speed difference detecting means comprises:
    speed signal-generating means, receiving as inputs a plurality of position signals, for producing a plurality of additional position signals from said input position signals, and for sequentially differentiating predetermined portions of the produced additional position signals and the input position signals to generate the speed signal;
    surge-suppressing means, receiving as an input said generated speed signal, for suppressing a surge component in said generated speed signal and for outputting as a detected speed signal the generated speed signal without the surge component at times when a control signal is input; and differential amplifying means for outputting the speed difference signal from the detected speed signal and the designated speed signal input thereto.

5. The apparatus according to claim 4, wherein said surge-suppressing means comprises:

holding means, in accordance with the control signal, for holding the generated speed signal input from said speed signal-generating means and for outputting the speed signal without the surge component; and switching means for selectively outputting as the detected speed signal one of the generated speed signal from said speed signal-generating means or the speed signal without the surge component from said holding means, in accordance with the control signal.

6. The apparatus according to claim 3, wherein said position signal-generating means generates the position signals each having phases determined by the first instruction and each having a period of four tracks.

7. The apparatus according to claim 6, wherein the position signals, generated by said position signal generating-means comprise two sinusoid-like wave signals whose phases are shifted by 90° with respect to each other.

8. The apparatus according to claim 6, wherein the selected position signal has a predetermined waveform at the destination track position, said predetermined waveform being positive when said magnetic head passes beyond the destination track position, and said predetermined waveform being negative when said magnetic head is located before the destination track position at a magnitude substantially corresponding to a distance from the destination track position.

9. The apparatus according to claim 6, wherein the first position signal has a predetermined waveform at the destination track position which is negative when said magnetic head passes beyond the destination track position, and which is positive when said magnetic head is located before the destination track position at a magnitude substantially corresponding to a distance from the destination track position.

10. The apparatus according to claim 3, wherein said control means comprises:

distance-detection means for detecting the distance between the destination track position and the current track position, on the basis of the selected position signal from said position signal-generating means;

speed signal-generating means for outputting the designated speed signal to the speed difference detecting-means, based on the input seek instruction and the detected distance from said distance-detection means;

first instruction-generating means for generating the first instruction to said position signal-generating means;

second instruction-generating means for generating the second instruction to said speed difference detecting-means; and third instruction-generating means for generating the third instruction to said switching means.

11. The apparatus according to claim 10, wherein the first instruction is generated such that the selected position signal crosses a zero level at the track position where the seek instruction is input, and the first instruction is generated immediately before the second instruction such that the selected position signal has a predetermined waveform until said head reaches a predetermined distance from the destination track position after the input of the seek instruction is completed, and the third instruction is generated when the detected distance is equal to a second predetermined distance, the second predetermined distance being shorter than the first predetermined distance.

12. The apparatus according to claim 11, wherein the selected position signal has a period of four tracks, the first predetermined distance is two tracks and the second predetermined distance is one track.

* * * * *